US011432236B1

(12) United States Patent
Marupaduga

(10) Patent No.: US 11,432,236 B1
(45) Date of Patent: Aug. 30, 2022

(54) DYNAMIC NODE ASSIGNMENT BASED ON TRANSMISSION POWER CAPABILITY

(71) Applicant: Sprint Spectrum LP, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/118,858

(22) Filed: Dec. 11, 2020

(51) Int. Cl.
*H04W 48/20* (2009.01)
*H04B 17/318* (2015.01)
*H04W 8/24* (2009.01)
*H04W 48/16* (2009.01)

(52) U.S. Cl.
CPC .......... *H04W 48/20* (2013.01); *H04B 17/318* (2015.01); *H04W 8/24* (2013.01); *H04W 48/16* (2013.01)

(58) Field of Classification Search
CPC ........................... H04W 52/143; H04W 16/14
USPC .......................................... 370/252; 455/522
See application file for complete search history.

(56) References Cited

U.S. PATENT DOCUMENTS

2011/0280201 A1* 11/2011 Luo .................. H04W 72/0406
370/329
2017/0026951 A1* 1/2017 Lou ............................ H04L 5/14
2020/0221390 A1 7/2020 Xu et al.

* cited by examiner

*Primary Examiner* — Kiet M Doan

(57) ABSTRACT

Systems and methods provide for assignment of wireless devices to an access node based on the transmission power capabilities of the access nodes and the wireless devices. The method may be applied to mobile wireless devices in overlapping coverage areas such that the transmission power capabilities of both the access node and the wireless device are considered during node assignment.

15 Claims, 7 Drawing Sheets

DYNAMIC NODE ASSIGNMENT BASED ON TRANSMISSION POWER CAPABILITY

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE eNodeBs and 5G NR gNodeBs. Furthermore, more recently developed access nodes may have different downlink transmit powers. For example, while a legacy node may have a 120 W transmit power, more recently deployed access nodes may have a 300 W downlink transmit power or a 320 W downlink transmit power.

Further, as UEs have evolved, in an effort to boost coverage and enhance throughput in wireless networks, higher power class User Equipment(s) (UEs) and/or wireless devices (HPUEs) have been proposed. HPUEs are capable of transmitting at a maximum allowable transmit power that is higher than lower power class UEs (LPUEs). As shown in Table 1 below, the maximum allowable transmit power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

HPUEs generally fall into power classes 1 or 2, whereas LPUEs fall into power class 3 or 4. While a LPUE may not successfully transmit to an access node in a heavily loaded network, an HPUE in the same location may have sufficient transmit power to continue to transmit to the access node. Further, it should be noted that both HPUEs and LPUEs may have specific hardware capabilities such that their transmit power may be greater than or less than the transmit power specified above with respect to each of the power classes.

While both access nodes and wireless devices may have different transmit powers and different characteristics and capabilities, existing mobility management methods fail to adequately consider the transmission characteristics of the access nodes and the wireless devices when assigning the wireless device to a particular access node in an area of coverage overlap. Accordingly, a solution is needed that considers transmission power capabilities of access nodes and wireless devices in order to assign the wireless devices to a particular access node in a manner that optimizes network performance.

OVERVIEW

Exemplary embodiments described herein include systems, methods, and processing nodes for assigning wireless devices to an access node based on transmit power capabilities of both the access nodes and the wireless devices. An exemplary method for assigning a wireless device to one of multiple access nodes includes detecting an overlapping coverage area in which multiple access nodes transmit. The method further includes determining that a first access node communicating within the overlapping coverage area has a first downlink transmission power and a second access node communicating within the overlapping coverage area has a second downlink transmission power, wherein the second downlink transmission power is greater than the first downlink transmission power. The method additionally includes detecting wireless devices in the overlapping coverage area and assigning the wireless devices to the first access node and the second access node based on wireless device characteristics. The characteristics of the wireless devices may include mobility characteristics and transmission power capabilities.

An additional exemplary embodiment includes a system for assigning wireless devices to an access node based on the transmission power capabilities of both the wireless devices and the access node. The system includes multiple access nodes having an overlapping coverage area and a processor coupled to at least one of the multiple access nodes. The processor is configured to perform multiple operations. The operations include determining that a first access node communicating within the overlapping coverage area has a first downlink transmission power and a second access node communicating within the overlapping coverage area has a second downlink transmission power, wherein the second downlink transmission power is greater than the first downlink transmission power. The operations further include detecting wireless devices in the overlapping coverage area and assigning the wireless devices to one of the first access node and the second access node based on wireless device characteristics.

An additional exemplary embodiment includes a processing node configured to perform multiple operations. The operations include identifying an overlapping coverage area for two access nodes having different downlink transmit power capabilities. The operations additionally include identifying at least one wireless device in the overlapping coverage area and classifying the wireless device as one of high-power class user equipment (HPUE) and low power class user equipment (LPUE); and assigning the wireless devices to the access nodes based on the different downlink transmit power capabilities and the classification of each identified wireless device as an HPUE or LPUE. The processing node may additionally be configured to identify mobile wireless devices within the overlapping coverage area and may perform the assignment only for the mobile wireless devices.

DETAILED DESCRIPTION

Figure 1:
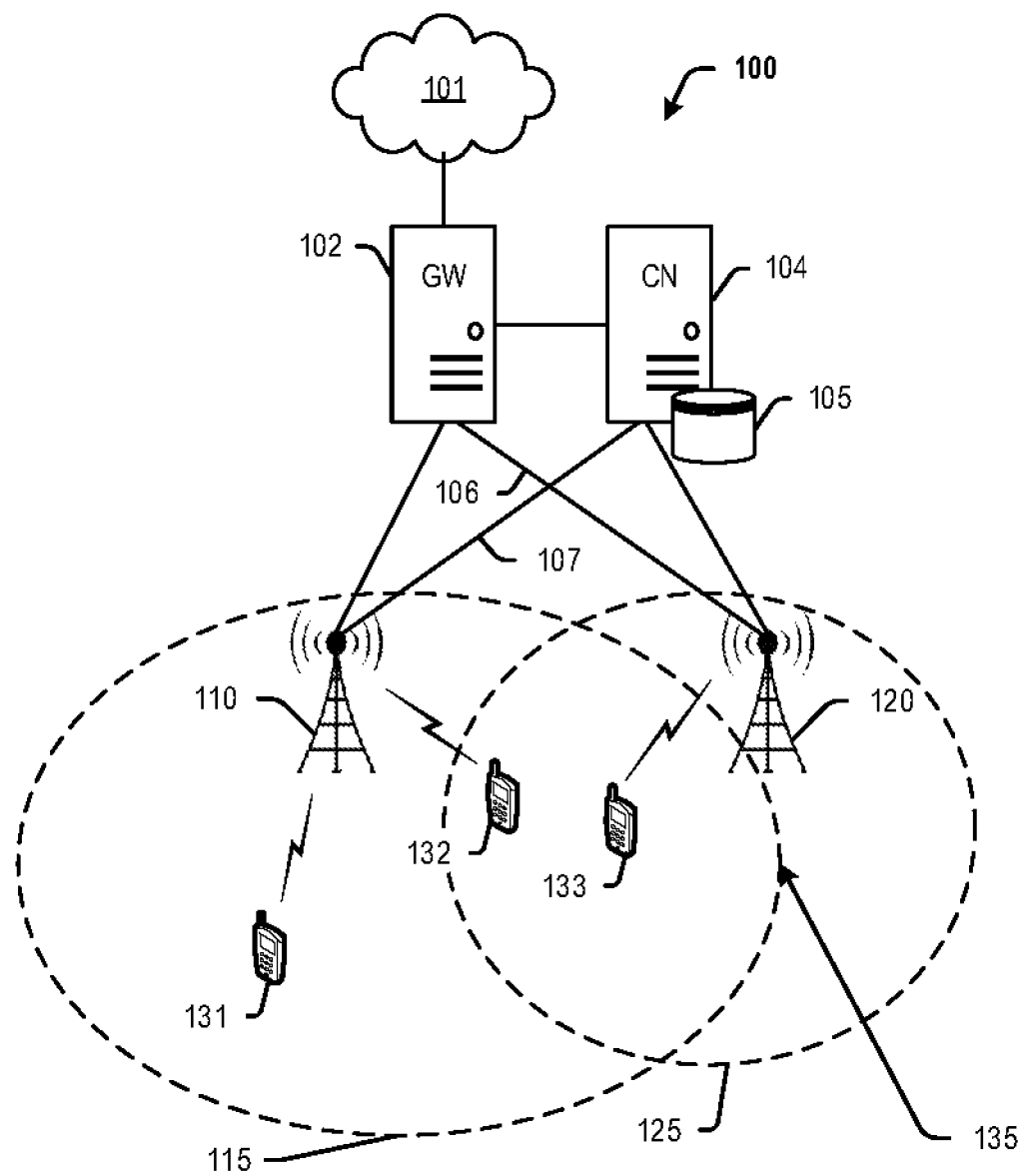
FIG. 1 depicts an exemplary system for wireless communication, in accordance with the disclosed embodiments.

Exemplary embodiments described herein include systems, methods, and processing nodes for assigning a wireless device to one of multiple access nodes when the wireless device is in an overlapping coverage areas. In particular, embodiments set forth herein assign a mobile wireless device located in an overlapping coverage area to one of multiple access nodes based on the downlink transmission power of the access node and the uplink transmission power of the wireless device. Thus, embodiments disclosed herein operate in heterogeneous networks that include access nodes have different downlink transmission power capabilities and also wireless devices having different uplink transmission power capabilities. The networks, may in some embodiments utilize an EN-DC architecture, which allows devices to access two different RATs, such as both LTE and 5G. Alternatively, the network may utilize only one RAT. In an EN-DC architecture, a master node may perform wireless device assignment. In another architecture, any access node or processor in the network may be capable of performing the assignment of the wireless device to a selected access node in the overlapping coverage area.

In embodiments disclosed herein, a cell or wireless network may be provided by an access node. The access node may utilize one or more antennas to communicate with wireless devices or UEs. Performance at a particular wireless device may be dependent on a number of factors including, for example, antenna performance parameters, network loading conditions, (number of connected HPUEs and LPUEs) and wireless device location within a cell or a sector. Because certain network conditions are likely to result in poor performance of wireless devices in the network, embodiments provided herein perform a method for an access node or processor within the network, to assign wireless devices moving through an area of overlapping coverage to one of the access nodes sending downlink signals to the area of overlapping coverage based on the downlink transmission power of the access node and the uplink transmission power of the wireless device. The assignment of the wireless device may be accomplished dynamically by a predetermined access node or processing node. As set forth above, in an EN-DC architecture, a master node may perform the assignment, but any access node may be capable of performing the assignment.

In embodiments set forth herein, the network may be a 5G NR network having multiple access nodes with multiple different transmission power capabilities. He access nodes are positioned such that at least one area of overlapping coverage exists within the network. Furthermore, a combination of HPUEs and LPUEs may communicate and travel within the network. Some HPUEs and LPUEs may be stationary, while others may be mobile. In embodiments set forth herein, the mobile HPUEs and LPUEs are assigned based on transmission power capabilities of the UEs and the access nodes, wherein the stationary wireless devices may be assigned to an access node based on a default load balancing algorithm.

Thus, in embodiments set forth herein, the mobile HPUEs are assigned to access nodes having a higher transmit power and the mobile LPUEs are assigned to access nodes having a lower downlink transmit power. The access nodes having the higher downlink transmission power will have a larger coverage area than the access nodes having a lower downlink transmission power. Thus, as wireless devices travel further from an access node having a high downlink transmission power, the wireless devices may not have sufficient power to send uplink signals back to the access node. Assignment of HPUEs to the access nodes having higher transmission power and larger coverage area aims to ensure that the wireless devices will have the capability to communicate with the access nodes on the uplink. The LPUEs may have insufficient transmission power capability to communicate with those same access nodes. Therefore, the LPUEs may be assigned to the access nodes operating within the overlapping coverage area having the lower transmission power capability and smaller coverage area.

In exemplary embodiments, a processor or processing node associated with an access node may determine whether a wireless device is a high power class wireless device or a low power class wireless device. In order to make this determination, access nodes may receive communications from wireless device such as HPUEs and LPUEs. For example, the HPUEs and LPUES can use a UE CAPABILITY message to indicate (or report) at to the access node that an HPUE is a power class 2 UE and/or wireless device that corresponds to a Power of +26 dBm (illustrated in Table 1) with a nominal power tolerance (i.e., power error limit) of ±2 dB (e.g., for E-UTRA bands). In addition, HPUEs or LPUEs can use power headroom report (PHR) and/or enhanced PHR (ePHR) message(s) to report a current transmit power state (e.g., how much power the HPUEs or LPUEs required in a previous subframe structure) to the AN. Alternatively, in another exemplary embodiment, HPUEs and LPUEs can be configured with a chipset type or version, which may be provided to the access node by the HPUEs or LPUEs during an ATTACH PROCEDURE. Other methods of communicating whether the UE is a HPUE or LPUE may be used in conjunction with the disclosed embodiments. Accordingly, a processor or processing node may determine if a wireless device interacting with the access node is an HPUE or an LPUE.

The processor or processing node is also programmed to identify areas of overlapping coverage. The areas of overlapping coverage may be identified through the coexistence of multiple physical cell IDs (PCIs) within a certain region. Additionally, the processor or processing node determines whether the UEs are mobile. This determination can be made through triangulation or geographical coordinates over time or based on a report sent to the access node by each UE.

When the access node, processor, or processing node identifies an area of overlapping coverage for access nodes having differing transmission power capabilities, it may be programmed to identify UEs within the overlapping coverage area. Upon identification of UEs within the overlapping coverage area, it may determine whether the UEs are mobile. If the UEs are mobile, it may further determine if the UEs are HPUEs or LPUEs and assign the HPUEs and LPUEs to an access node based on their transmission power capability and the transmission power capabilities of the access nodes. If the UEs are not mobile, the processing node may assign the UEs to an access node based on a standard load balancing algorithm.

Therefore, in accordance with embodiments disclosed herein, methods and systems assign wireless devices to an access node based on a transmission power capability of the access node and characteristics of the wireless device. The characteristics include both mobility characteristics and transmission power capabilities of the wireless devices. Because certain network conditions are likely to result in poor performance, embodiments provided herein dynamically determine node assignments to enhance performance parameters for each wireless device in a particular region.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of assigning wireless devices to access nodes based on transmission power capabilities may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system 100 for use in conjunction with embodiments disclosed herein. System 100 comprises a communication network 101, gateway 102, controller node 104, access nodes 110 and 120, and wireless devices 131, 132, and 133. Access node 110 is illustrated as having a coverage area 115, and access node 120 is illustrated as having a coverage area 125. As illustrated, the coverage area 115 may be larger than the coverage area 125. This may result from the access node 110 having higher power transmission capabilities than the access node 120. For example, the access node 120 may be capable of a 320 W downlink transmission power and the access node 120 may be capable of a 120 W downlink transmission power.

Wireless devices 131, 132 are located within coverage area 115 and access network services from access node 110. Wireless device 133 is located within coverage area 125 and accesses network services from access node 120. Further, wireless devices 132 and 133 are located within overlapping coverage area 135 formed by an overlap of coverage areas 115, 125. For example, access nodes 110, 120 may be configured to deploy individual sectors and the overlapping coverage area 135 may comprise any overlapping coverage area of the sectors.

Thus, and as further described herein, wireless devices 132 and 133, which may be in the overlapping coverage area 135, may have specific characteristics such as mobility characteristics and power transmission capabilities. For example, the wireless devices 132 and 133 may be mobile or stationary and further may be HPUEs or LPUEs. Upon verification of these characteristics, methods described herein assign the wireless devices to one of the access nodes 110 and 120 based on the transmission power capabilities of the access nodes 110 and 120.

Access nodes 110, 120 can be any network node configured to provide communication between wireless devices 131, 132, 133 and communication network 101, including standard access nodes and/or short range, low power, small access nodes. For instance, access nodes 110, 120 may include any standard access node, such as a macrocell access node, base transceiver station, a radio base station, next generation NodeBs (gNBs) in 5G networks, or enhanced eNodeBs (eNBs) in 4G/LTE networks, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133 may be any device, system, combination of devices, or other such communication platform capable of communicating wirelessly with access nodes 110, 120 using one or more frequency bands deployed therefrom. Wireless devices 131, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible. As set forth above, the wireless devices can be HPUEs or LPUEs and in embodiments disclosed herein, are a combination of HPUEs and LPUEs.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as location information for overlapping coverage area 135, positions of wireless devices 131, 132, 133, transmission power capabilities, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Further, a scheduling entity (within, for example, one or both of access nodes 110, 120, or controller node 104) may be configured to allocate resources and provide node assignment instructions, thereby improving wireless device performance in the overlapping coverage area 135. For example, in a 5G network, if the wireless device 132 is a mobile HPUE, it may be assigned to the access node 110, which has higher transmission power capabilities than the access node 120. Further, if the wireless device 133 is a mobile LPUE, it may be assigned to the access node 120, which has a lower transmission power capability than the access node 110. In embodiments disclosed herein, one or more of access nodes 110, 120 may comprise logic for performing operations including determining transmission power capabilities of access nodes and wireless devices, determining mobility characteristics of wireless devices, and determining an area of overlapping coverage.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
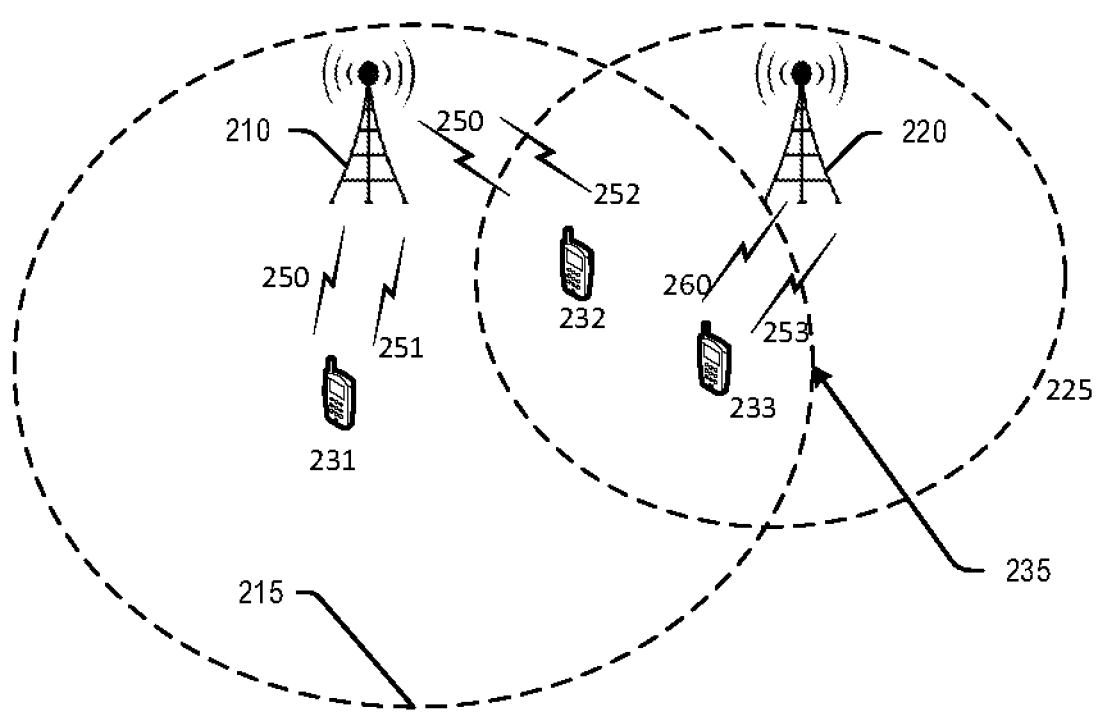
FIG. 2 illustrates an exemplary configuration of wireless communications in an overlapping coverage area.

FIG. 2 illustrates an exemplary configuration of wireless communications in an overlapping coverage area. The access nodes 210 and 220 communicate with multiple wireless devices 231, 232, and 233. The access node 210 has a downlink transmission power 250 and the access node 220 has a downlink transmission power 260. In the illustrated embodiment, the downlink transmission power capability 250 is greater than the downlink transmission power capability 260. Furthermore, a coverage area 215 of the access node 210 is larger than a coverage area 225 of the access node 220. Additionally, both access nodes 210 and 220 communicate with the wireless devices in an overlapping coverage area 235.

The wireless device 231 is located within the coverage area 215 and has an uplink transmission power 251. Both wireless devices 232 and 233 are located within both coverage areas 215 and 225 and thus are located in the overlapping coverage area 235. Wireless device 232 may for example be an HPUE having an uplink transmission power 252 and wireless device 233 may, for example be an LPUE having an uplink transmission power 253. In methods described herein, a processor detects the presence of the wireless devices 232 and 233 in the overlapping coverage area 235. Upon detection of the presence of the devices in the overlapping coverage area 235, the processor determine whether the wireless devices are mobile. If the wireless devices are mobile, the processor further determines whether they are LPUEs or HPUEs and assigns them to the access nodes 210 and 220 accordingly. For example, when wireless device 232 is an HPUE moving within the overlapping coverage area 235, the method assigns the wireless device 232 to the access node 210, which has higher transmission power capabilities than the access node 220. When the wireless device 233 is an LPUE and is moving within the overlapping coverage area 235, the processor assigns the wireless device 233 to the access node 220, which has lower transmission power capabilities than the access node 210.

In exemplary embodiments, access node 210 can include a gNodeB and access node 220 can include an eNodeB. In alternative embodiments, both access nodes 210 and 220 may be the same type of node, such as a gNodeB or an eNodeB. Although only two access nodes are shown, more than two access nodes may be employed in the network and may share an overlapping coverage area. In some embodiments, an eNodeB may operate as a master node and may dynamically assign wireless devices to an access node. In other embodiments, any access node or processing node in the network may operate dynamically to assign the wireless devices to an access node when the wireless devices are present in the overlapping coverage area 235. While the different access nodes 210 and 220 may deploy wireless air interfaces using different RATs, they may also operate by deploying wireless air interfaces using the same RAT, such as a 5G NR or 4G LTE.

Further, a processing node communicatively coupled to any of access nodes 210, 220 can be configured to dynamically assign the wireless devices 232 and 233 to one of the access nodes by determining a characteristic of the wireless device, such as whether the wireless devices 232, 233 are HPUEs or LPUEs and whether the devices are mobile.

Figure 3:
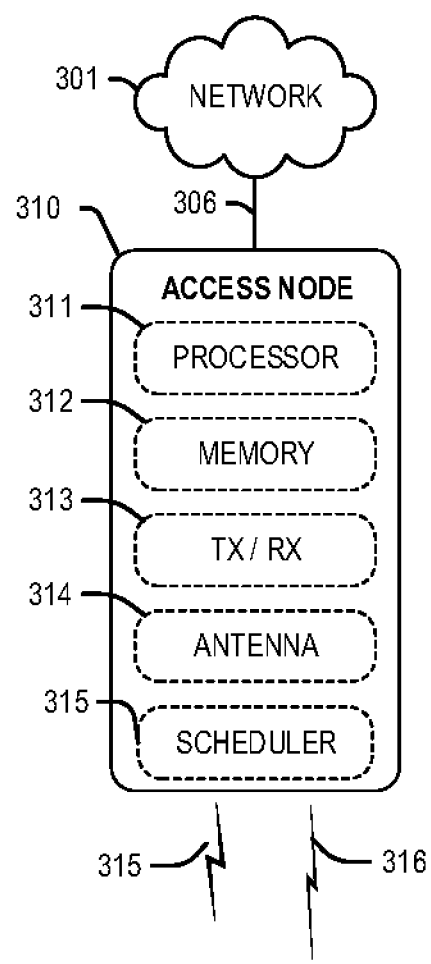
FIG. 3 depicts an access node in accordance with disclosed embodiments.

FIG. 3 depicts an exemplary access node 310. Access node 310 may comprise, for example, a macro-cell access node, such as access nodes 110 or 120 described with reference to FIG. 1. Access node 310 is illustrated as comprising a processor 311, memory 312, transceiver 313, and antenna 314. Processor 311 executes instructions stored on memory 312, while transceiver 313 and antenna 314 enable wireless communication with other network nodes, such as wireless devices and other nodes. For example, access node 310 may be configured to detect wireless devices located in an overlapping coverage area, detect characteristics of the wireless devices and the access nodes and dynamically assign the wireless devices to an access node based on the characteristics. Scheduler 315 may be provided for scheduling resources based on the presence of the wireless devices. These features may be enabled by access node 310 comprising two co-located cells, or antenna/transceiver combinations that are mounted on the same structure. Network 301 may be similar to network 101 discussed above. The wireless devices may operate in carrier aggregation mode, during which a wireless device utilizes more than one carrier, enabling the wireless devices to communicate with access node 310 using a combination of resources from multiple carriers.

Figure 5:
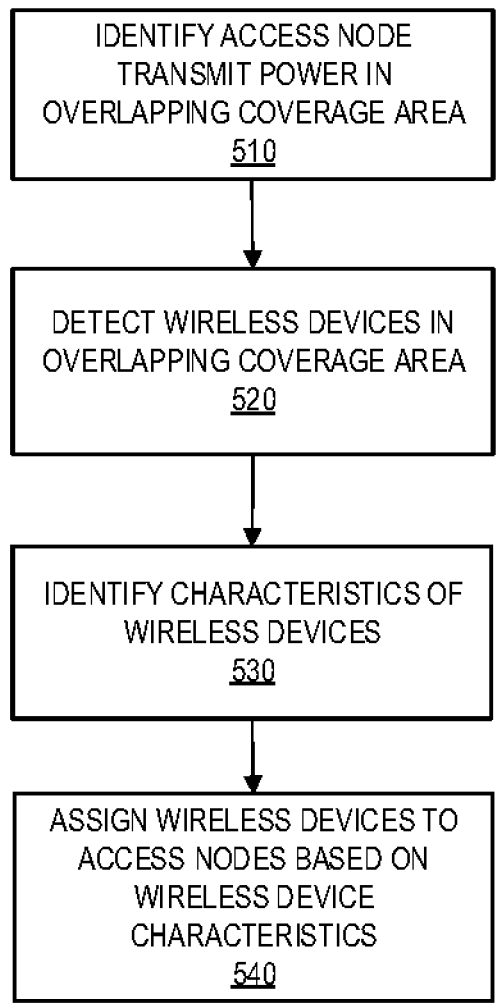
FIG. 5 depicts an exemplary method for assigning a wireless device to an access node based transmission power capabilities in accordance with disclosed embodiments.

Further, instructions stored on memory 312 can include instructions for dynamically assigning wireless devices to an access node, which will be further explained below with reference to FIGS. 5-7. The instructions may facilitate identifying characteristics of UEs, such as transmit power and mobility. The instructions may further facilitate identifying characteristics of access nodes such as downlink transmit power capability. The instructions may dictate dynamic assignment of a wireless device to an access node based on the above-identified characteristics.

Figure 4:
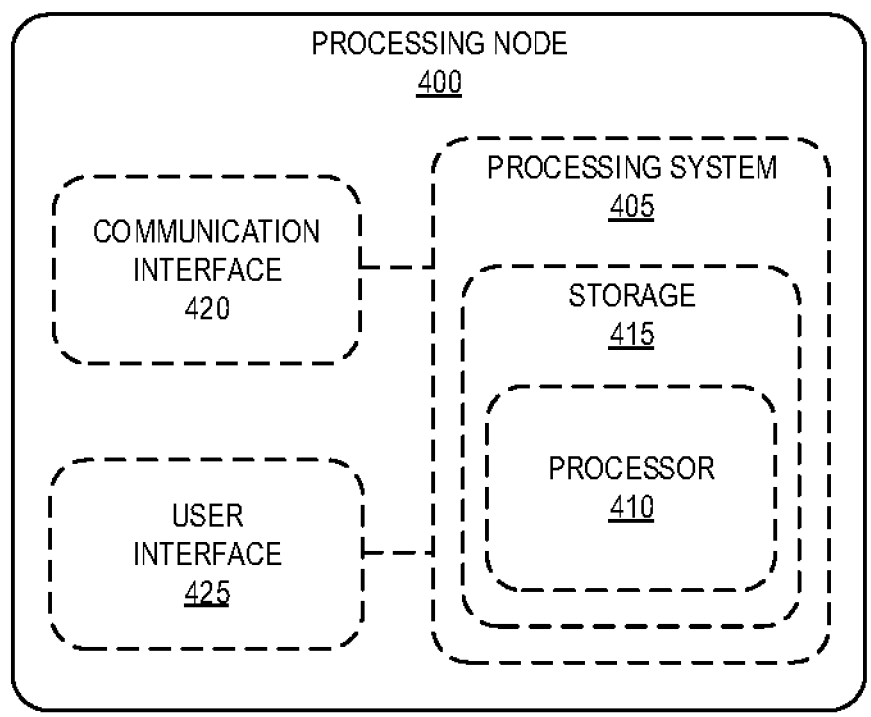
FIG. 4 depicts a processing node in accordance with the disclosed embodiments.

FIG. 4 depicts an exemplary processing node 400, which may be configured to perform the methods and operations disclosed herein for assigning wireless devices to an access node based on transmission power capabilities. In some embodiments, processing node 400 may be included in an access node, such as access node 110, 120, 210, 220, or 310. In further embodiments, processing node 400 may be included in controller node 104 and may be configured for controlling the access nodes.

Processing node 400 may be configured for performing wireless device assignment by assigning wireless devices to an access node based on transmission power capabilities of the access nodes and the wireless devices as well as location and mobility characteristics of the wireless devices. The assignment may occur dynamically in real time based on the above-identified criteria. Processing node 400 may include a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes maybe accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. Processor 410 may be a microprocessor and may include hardware circuitry and/or embedded codes configured to retrieve and execute software stored in storage device 415.

Processing node 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to processing node 400 and receive data or information from processing node 400. User interface 425 may include hardware components, such as touch screens, buttons, displays, speakers, etc. Processing node 400 may further include other components such as a power management unit, a control interface unit, etc.

The disclosed methods for assigning wireless devices to an access node based on transmission power capabilities are further discussed with reference to FIGS. 5-7. FIG. 5 illustrates an exemplary method 500 for assignment of wireless device to an access node. The method may occur in dynamically in real time or at predetermined intervals. Method 500 may be performed by any suitable processor discussed herein, for example, a processor included in access node 110, 120, 210, 220, or 310, processor 410 included in processing node 400, or a processor included in controller node 104. For discussion purposes, as an example, method 500 is described as being performed by a processor included in access node 110.

Method 500 starts in step 510 when the access node identifies access node transmission power capabilities for access nodes sharing an overlapping coverage area. The transmission power capabilities may be retrieved from a database or reported by the respective access nodes in real time. The overlapping coverage area may be identified through the presence of multiple PCIs or alternatively based on reports from wireless devices of multiple downlink signals in the overlapping coverage area.

In step 520, the method detects wireless devices located in the overlapping coverage area. The wireless devices may be detected based on reports sent by the wireless devices to a network processor. Alternatively, the wireless devices may be detected based on triangulation or reported geographical coordinates.

In step 530, the access node identifies characteristics of the wireless devices located in the overlapping coverage area. Mobility characteristics of the wireless devices may be identified, i.e., the access node may determine whether the wireless devices in the overlapping coverage area are moving or whether they are stationary. Further, the access node may ascertain characteristics related to transmission power capabilities of the wireless devices. As explained above, HPUEs have higher transmission power capabilities than LPUEs. In embodiments set forth herein, the access node determines of the wireless device is an HPUE or an LPUE device. The identification may be made based on numerous methods including communications received at the access node from the wireless device. For example, the HPUEs and LPUES can use a UE CAPABILITY message to indicate (or report) at to the access node that an HPUE is a power class 2 UE and/or wireless device that corresponds to a Power of +26 dBm (illustrated in Table 1) with a nominal power tolerance (i.e., power error limit) of ±2 dB (e.g., for E-UTRA bands). In addition, HPUEs or LPUEs can use power headroom report (PHR) and/or enhanced PHR (ePHR) message(s) to report a current transmit power state (e.g., how much power the HPUEs or LPUEs required in a previous subframe structure) to the AN. Alternatively, in another exemplary embodiment, HPUEs and LPUEs can be configured with a chipset type or version, which may be provided to the access node by the HPUEs or LPUEs during an ATTACH PROCEDURE. Other methods of communicating whether the UE is a HPUE or LPUE may be used in conjunction with the disclosed embodiments. Accordingly, a processor or processing node may determine if a wireless device is interacting with the access node is an HPUE or an LPUE.

In step 540, the access node assigns the wireless devices in the overlapping coverage area to an access node transmitting to the overlapping coverage area. For example, in embodiments set forth herein, the access node may assign mobile HPUEs to an access node having a highest transmission power capability and may assign mobile LPUEs to the secondary node having a lower transmission power capability. By this assignment, the access node ensures that the wireless devices will have sufficient transmission power capability on the uplink to communicate with the assigned access node even as the wireless devices move away from the access node. As set forth above, different access nodes may be preconfigured with different transmission power capabilities, ranging from, for example 120W to 320 W. The access nodes having the higher transmission power capabilities nay also have a larger coverage area, thus as LPUEs move away from the higher power access nodes, they may be unable to communicate on the uplink due to their lack of uplink transmission power capabilities. In embodiments set forth herein, if the wireless devices are not mobile, they may be assigned to an access node by a stored default load balancing algorithm or based on interference or noise in the sector. Thus, in overlapping coverage areas, the UEs having the stronger signal transmission characteristics, i.e., HPUEs, are likely to be able to continue to transmit as they move away from the higher power access nodes, thereby improving overall network performance and reducing occurrence of handovers.

The assignment of the wireless device to the selected access node may be accomplished, for example, by an instruction sent by the access node to the wireless device for example by utilizing an RRC connection reconfiguration message or another message or indicator directed specifically to the wireless device.

Figure 6:
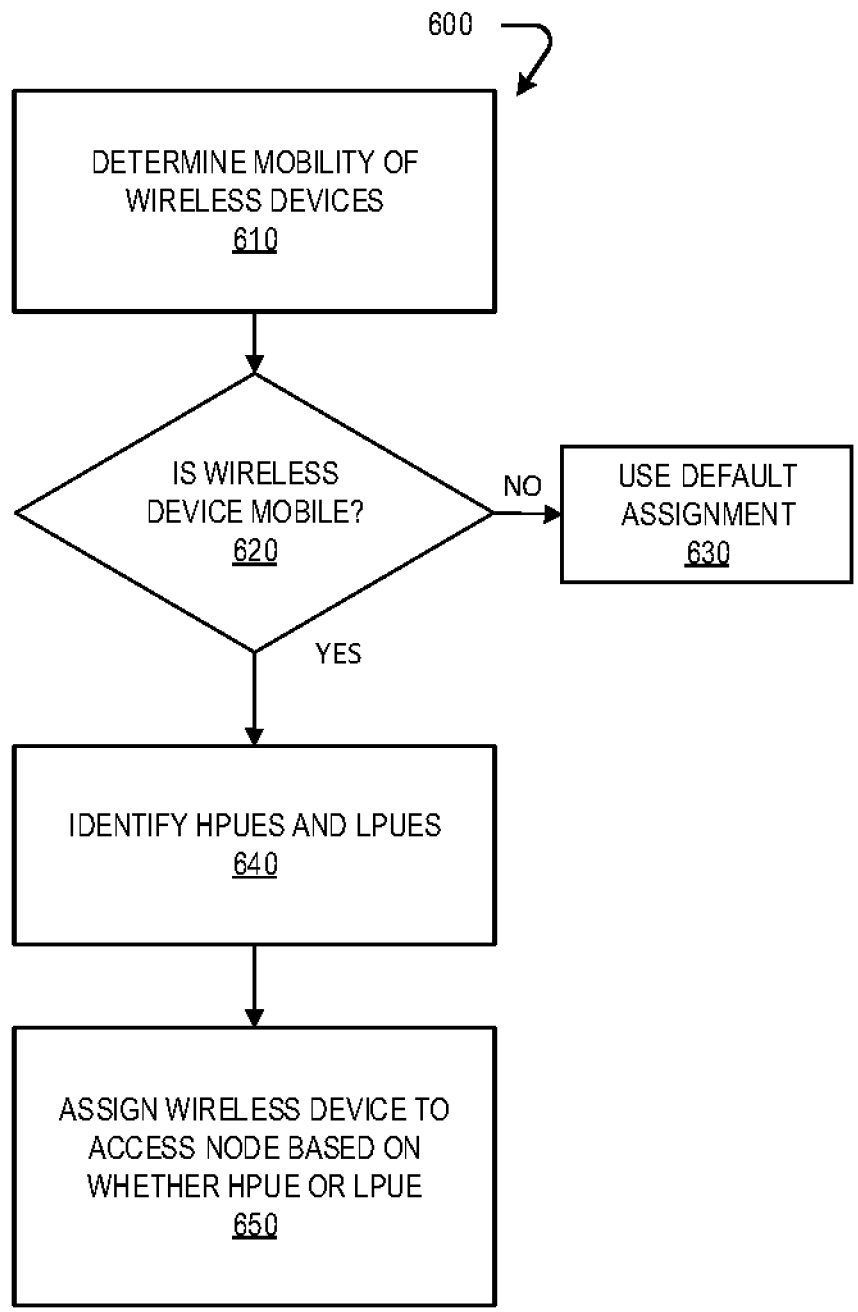
FIG. 6 depicts an exemplary method for determining characteristics of wireless devices for assignment to an access node in accordance with disclosed embodiments.

The method of FIG. 6 illustrates a method 600 for determining characteristics of the wireless devices for the purpose of dynamic assignment of UEs to an access node based on transmission power capabilities of both the UEs and the access nodes. Method 600 may be performed by any suitable processor discussed herein, for example, a processor included in access node 110, 120, 210, 220 or 310, processor 410 included in processing node 400, or a processor included in controller node 104. For discussion purposes, as an example, method 600 is described as being performed by a processor included in access node 110.

In step 610, the access node determines the mobility of the wireless devices. Mobility can be determined based on reports from the wireless devices or based on triangulation or geographical coordinates measured over time. Specifically the access node classifies the wireless device as stationary or mobile. In step 620, the access node determines if the wireless device is mobile. If the access node determines that the wireless device is not mobile in step 620 and is thus stationary, a default assignment method using a load balancing algorithm may be utilized to assign the wireless device to an access node. However, if the wireless device is deemed to be mobile in step 620, the access node may identify the wireless devices as an HPUE or LPUE as explained above with respect to FIG. 5. In step 640, the access node may assign the mobile wireless devices to an access node based on whether the mobile wireless devices are HPUEs or LPUEs. As set forth above, the HPUEs are assigned to an access node with higher transmission power capabilities on the downlink and the LPUEs are assigned to access nodes have a lower transmission power capability on the downlink. The assignment of the wireless device to the selected access node may be accomplished, for example, by an instruction sent by the access node to the wireless device for example by utilizing an RRC connection reconfiguration message or another message or indicator directed specifically to the wireless device.

Figure 7:
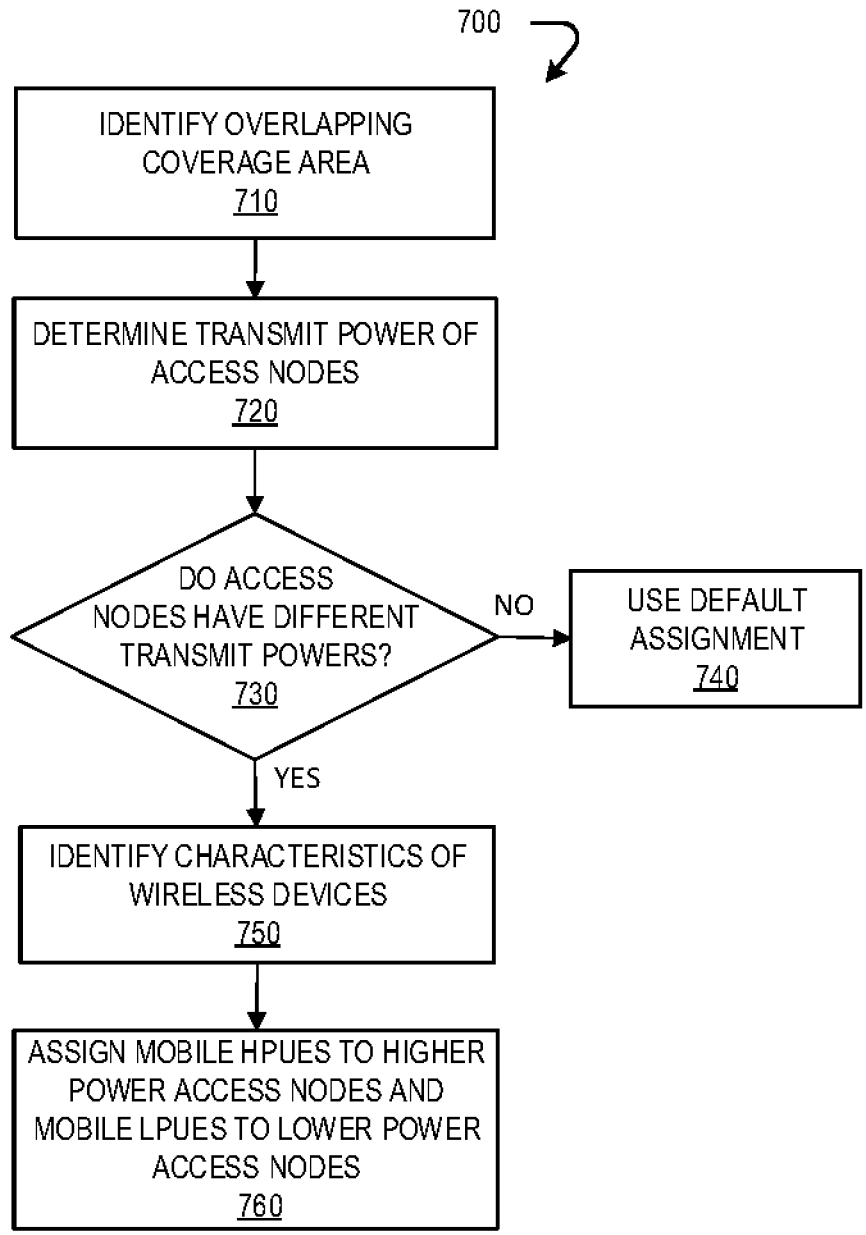
FIG. 7 depicts another exemplary method for assigning wireless devices to an access node in accordance with disclosed embodiments.

The method of FIG. 7 illustrates a method 700 for dynamic assignment of UEs to an access node. Method 700 may be performed by any suitable processor discussed herein, for example, a processor included in access node 110, 120, 210, 220, 3100, or processor 410 included in processing node 400, or a processor included in controller node 104. For discussion purposes, as an example, method 700 is described as being performed by a processor included in access node 110.

In step 710, the access node identifies an overlapping coverage area where at least two access nodes provide coverage to wireless devices. The overlapping coverage area may be identified, for example, by the presence of multiple PCIs in a particular area. The overlapping coverage area may also be detected based on reports from wireless devices or based on antenna parameters such as SINR measured over a time period.

In step 720, the access node determines the transmission power capability of each access node providing coverage in the overlapping coverage area. The transmission power capabilities may be stored and retrieved from a database or alternatively may be reported by the access nodes. As set forth above, different access nodes may have different transmission power capabilities. Alternatively in some networks, all of the access nodes may have the same transmission power capabilities.

If, in step 730, the access node determines that all access nodes communicating in the overlapping coverage area have the same transmission power capabilities, e.g., all of the access nodes are capable of transmitting on the downlink at 120 W, then a default assignment method will be used in step 740 to assign wireless devices in the overlapping coverage area to an access node. For example, assignment can be performed based on noise level or based on a default load balancing algorithm. However, if in step 730, the access node determines that the access nodes communicating in the overlapping coverage area have different transmission power capabilities, e.g., one access node has a 120 W downlink transmission power and another has a 320 W downlink transmission power, the access node proceeds to step 750 to identify characteristics of wireless devices prior to completion of dynamic assignment of the wireless devices to an access node.

In step 750, the access node identifies characteristics of the wireless devices in the overlapping coverage area. Step 750 may for example include all of steps 610-640 explained above with reference to FIG. 6. Thus, in identifying characteristics of the wireless devices, the access node may determine if the wireless devices in the overlapping coverage area are mobile. If the wireless devices are not mobile, then a default node assignment method may be used, such as a load balancing algorithm. However, for any wireless devices in the overlapping coverage area that are deemed to be mobile, the access node proceeds to identify transmission power capabilities of those wireless devices. For example, the access node determines whether the wireless devices are HPUEs or LPUEs. In embodiments set forth herein, the access node may determine, for example, a transmit power of the wireless device, a chipset of the wireless device, or PHR of the wireless device. The determination may be made at the access node, for example, based on notifications sent by the wireless device to the access node.

In step 760, the access node assigns the mobile HPUEs in the overlapping coverage area to access nodes having higher transmission power capabilities and the mobile LPUEs to the access node or nodes having lower downlink transmission power capabilities. The assignment of the wireless device to the selected access node may be accomplished, for example, by an instruction sent by the access node to the wireless device for example by utilizing an RRC connection reconfiguration message or another message or indicator directed specifically to the wireless device In some embodiments, methods 500, 600, and 700 may include additional steps or operations. Furthermore, the methods may include steps shown in each of the other methods. As one of ordinary skill in the art would understand, the methods 500, 600, and 700 may be integrated in any useful manner. Additionally, in order to optimize a heterogeneous network, the methods disclosed may be performed for multiple devices in the network so that the wireless devices can be appropriately assigned. By the methods described herein, wireless device performance can be improved, and the occurrence of handovers can be reduced.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:

detecting an overlapping coverage area;

determining that a first access node communicating within the overlapping coverage area has a first downlink transmission power and a second access node communicating within the overlapping coverage area has a second downlink transmission power, wherein the second downlink transmission power is greater than the first downlink transmission power;

detecting a first wireless device and a second wireless device in the overlapping coverage area;

determining that the first wireless device is a high power user equipment (HPUE) wireless device and that the second wireless device is a low power user equipment (LPUE) wireless device; and assigning the first wireless device and the second wireless device to the first access node and the second access node based on determining the first wireless device is a HPUE wireless device and the second wireless device is a LPUE wireless device.

2. The method of claim 1, further comprising assigning the first wireless device to the second access node.

3. The method of claim 1, further comprising assigning the second wireless device to the first access node.

4. The method of claim 1, wherein the first access node and the second access node are gNodeB access nodes deploying a 5G NR wireless air interface.

5. The method of claim 1, wherein the second access node is a 5G NR gNodeB and the first access node is a 4G LTE eNodeB.

6. The method of claim 1, wherein detecting the wireless devices in the overlapping coverage area comprises performing triangulation to obtain wireless device locations.

7. The method of claim 1, wherein detecting the overlapping coverage area comprises receiving a report from at least one wireless device.

8. A system comprising:

multiple access nodes having an overlapping coverage area; and a processor coupled to at least one of the multiple access nodes;

the processor configured to perform operations comprising, determining that a first access node communicating within the overlapping coverage area has a first downlink transmission power and a second access node communicating within the overlapping coverage area has a second downlink transmission power, wherein the second downlink transmission power is greater than the first downlink transmission power;

detecting a first wireless device and a second wireless device in the overlapping coverage area;

determining that the first wireless device is a high power user equipment (HPUE) wireless device and that the second wireless device is a low power user equipment (LPUE) wireless device; and assigning the first wireless device and the second wireless device to one of the first access node and the second access node based on determining the first wireless device is a HPUE wireless device and the second wireless device is a LPUE wireless device.

9. The system of claim 8, the processor further assigning the first wireless device to the second access node.

10. The system of claim 8, the processor further assigning the second wireless device to the first access node.

11. A processing node configured to perform operations comprising:

identifying an overlapping coverage area for two access nodes, the two access nodes having different downlink transmit power capabilities;

identifying at least one wireless device in the overlapping coverage area and classifying the wireless device as one of high-power class user equipment (HPUE) and low power class user equipment (LPUE); and assigning the wireless devices to the access nodes based on the different downlink transmit power capabilities and the classification of each identified wireless device as an HPUE or LPUE.

12. The processing node of claim 11, further configured to identify mobile wireless devices within the overlapping coverage area and performing the assignment only for the mobile wireless devices.

13. The processing node of claim 11, further configured to identify the downlink transmit power capabilities of the access nodes.

14. The processing node of claim 13, further configured to assign any identified HPUE to an access node having a first downlink transmit power higher than a second downlink transmit power.

15. The processing node of claim 14, further configured to assign any identified LPUE to an access node having a second downlink transmit power lower than the first downlink transmit power.

* * * * *